(12) United States Patent
Wong

(10) Patent No.: US 7,681,200 B2
(45) Date of Patent: Mar. 16, 2010

(54) SECURE HARDWARE DESKTOP BUFFER COMPOSITION

(75) Inventor: Dan Wong, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1262 days.

(21) Appl. No.: 11/187,303

(22) Filed: Jul. 22, 2005

(65) Prior Publication Data

US 2007/0018992 A1    Jan. 25, 2007

(51) Int. Cl.
  *G06F 9/46* (2006.01)
  *G06F 3/048* (2006.01)
(52) U.S. Cl. ........................ 718/108; 715/778
(58) Field of Classification Search ......... 718/100–108; 715/778
  See application file for complete search history.

(56) References Cited

U.S. PATENT DOCUMENTS

| | | | | |
|---|---|---|---|---|
| 6,092,107 | A * | 7/2000 | Eleftheriadis et al. | 709/217 |
| 6,359,631 | B2 * | 3/2002 | DeLeeuw | 345/629 |
| 6,631,403 | B1 * | 10/2003 | Deutsch et al. | 709/217 |
| 6,681,238 | B1 * | 1/2004 | Brice et al. | 718/1 |
| 6,911,983 | B2 | 6/2005 | Sabella et al. | |
| 7,019,752 | B1 * | 3/2006 | Paquette et al. | 345/543 |
| 7,069,519 | B1 | 6/2006 | Okude et al. | |
| 7,272,799 | B2 * | 9/2007 | Imada et al. | 715/767 |
| 2002/0173863 | A1 | 11/2002 | Imada et al. | |
| 2004/0049530 | A1 * | 3/2004 | Lok et al. | 709/201 |
| 2005/0088447 | A1 | 4/2005 | Hanggie et al. | |
| 2005/0097298 | A1 * | 5/2005 | Cohen | 711/206 |
| 2005/0268298 | A1 * | 12/2005 | Hunt et al. | 718/1 |
| 2006/0146057 | A1 * | 7/2006 | Blythe | 345/506 |
| 2007/0011066 | A1 * | 1/2007 | Steeves | 705/35 |
| 2007/0028244 | A1 * | 2/2007 | Landis et al. | 718/108 |

FOREIGN PATENT DOCUMENTS

EP    1 087 289    3/2001

OTHER PUBLICATIONS

Supplementary European Search Report dated Oct. 30, 2009, in corresponding EP Application No. 06787177.2.

* cited by examiner

*Primary Examiner*—Meng-Ai An
*Assistant Examiner*—Adam Lee
(74) *Attorney, Agent, or Firm*—Woodcock Washburn LLP

(57) ABSTRACT

A plurality of virtual machines are executed on a host computer, the host computer including graphics hardware, and a display. The virtual machines write display data to their respective virtual desktop buffers. A virtual machine is selected to output to the display of the host computer. A composition buffer on the graphics hardware is enabled with respect to the selected virtual machine. The contents of the virtual desktop buffer associated with the selected virtual machine are copied to the composition buffer by the graphics hardware. The contents of the composition buffer are rendered and displayed by the graphics hardware. In addition, read access to the compositing buffer is restricted to the graphics hardware, thus preventing malicious software applications from capturing the display data across partitions.

18 Claims, 5 Drawing Sheets

SECURE HARDWARE DESKTOP BUFFER COMPOSITION

BACKGROUND

Virtual machines enable a host computer to run multiple application environments or operating systems on the same computer simultaneously. The host computer allots a certain amount of the host's resources to each of the virtual machines. Each virtual machine is then able to use the allotted resources to execute applications, including operating systems. The virtual machine virtualizes the underlying hardware of the host computer or emulates hardware devices, making the use of the virtual machine transparent to the operating system or the user of the computer.

In the virtual PC environment, PC hardware is shared amongst multiple partitions or virtual machines. In such an execution environment, the primary O/S (i.e., the O/S hosting each of the virtual machines) typically owns the graphics hardware, and accordingly, the desktop buffer composition process. The desktop buffer composition process determines what virtual machine output is displayed on the screen at any one time. Because each virtual machine believes that it has complete control over the host machine, each virtual machine may output to its own virtual desktop buffer. In order to bring pixels produced by the virtual machines to the graphics subsystem, the primary O/S is provided access to these virtual desktop buffers. Providing the primary O/S access to the virtual desktop buffers introduces a security challenge to the confidentiality of the video data generated by other partitions. This is particularly undesirable if one of these partitions is running a secure O/S.

For example, a malicious user may desire to record the video output of one or more virtual machines executing on a host. Because access to the virtual machine desktop buffer is provided to the desktop compositing process of the primary O/S to composite the final image to put on the display, the malicious user can modify the compositing process to access sensitive information rendered onto the virtual desktop buffer that belongs to another partition. The malicious user could then generate a movie comprising the displayed activity of any given virtual machine, or even modify screen content to mislead users to make incorrect decisions.

SUMMARY

A plurality of virtual machines are executed on a host computer, the host computer including graphics hardware, and a display. The graphics hardware is capable of duplicating and combining virtual desktop pixels onto hardware compositing buffer. The virtual machines write display data to their respective virtual desktop buffers. A virtual machine is selected to output to the display of the host computer. A composition buffer on the graphics hardware is enabled with respect to the selected virtual machine. The contents of the virtual desktop buffer associated with the selected virtual machine are copied to the composition buffer by the graphics hardware. The contents of the composition buffer are rendered and displayed by the graphics hardware. In addition, read access to the compositing buffer is restricted to the graphics hardware, thus preventing malicious software applications from capturing the display data across partitions.

DETAILED DESCRIPTION

Figure 1:
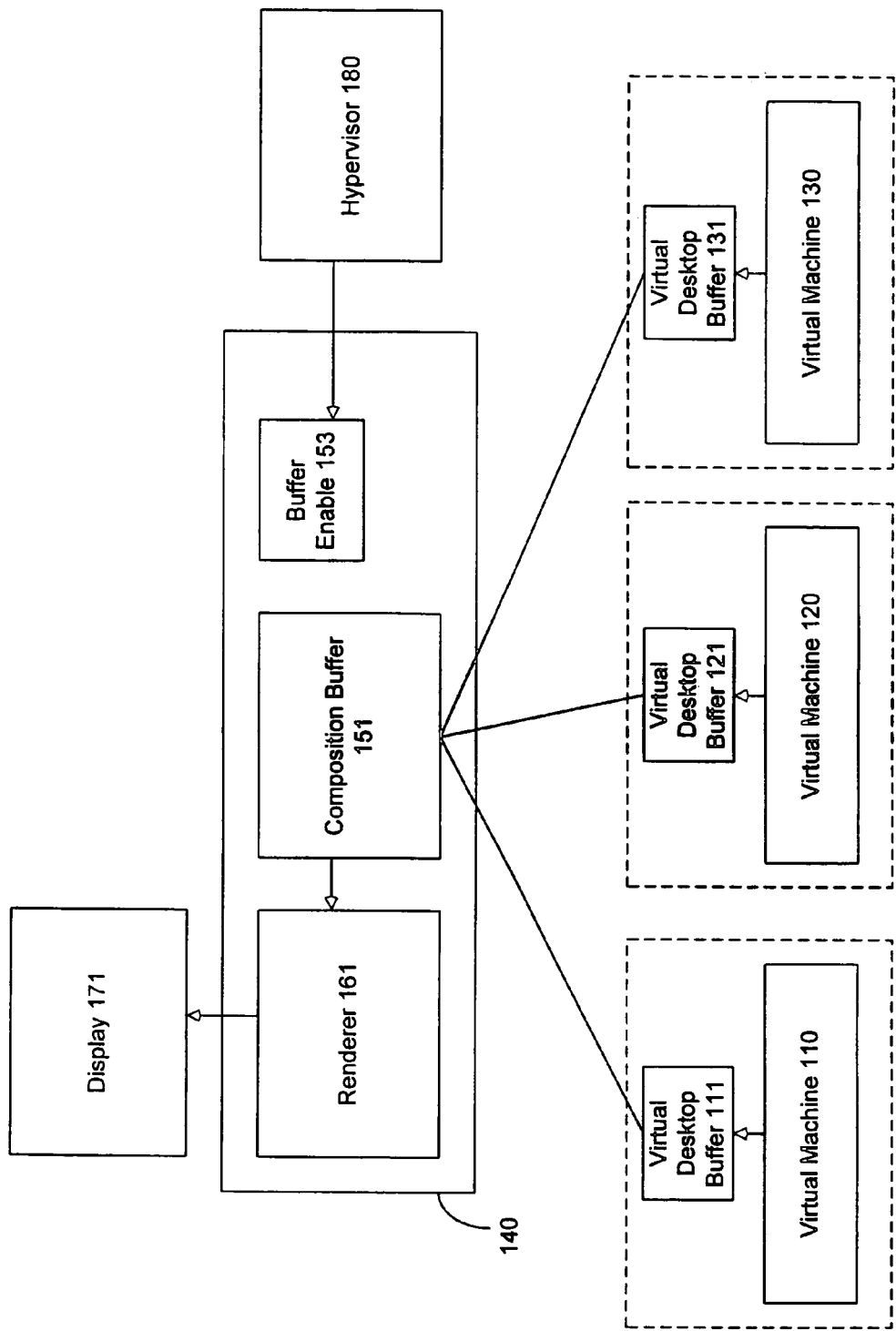
FIG. 1 is a block diagram illustrating an exemplary desktop buffer composition host computer in accordance with the present invention.

FIG. 1 is a block diagram illustrating an exemplary desktop buffer composition host computer in accordance with the invention. As shown, the host computer features a plurality of virtual machine clients 110, 120, and 130. Each of the virtual machine clients 110, 120, and 130 may be executing on the host computer. Each virtual machine client 110, 120, and 130, may be executing their own operating systems and applications, and behave as if they had complete control over the resources of the host computer. However, the resources of the host computer are shared among the virtual machine clients 110, 120, and 130 and controlled by the operating system of the host computer. While there are only three virtual machine illustrated in FIG. 1, it is for illustrative purposes only, and not meant to limit the invention. There is no limit to the number of virtual machines that may be supported.

Virtual machines 110, 120, and 130 may have an associated virtual desktop buffer. As shown, virtual machine 110 has virtual desktop buffer 111, virtual machine 120 has virtual desktop buffer 121, and virtual machine 130 has virtual desktop buffer 131. The virtual machines output data to their respective virtual desktop buffer to be displayed. For example, virtual machine 110 may display a current desktop including open applications or desktop icons. Accordingly, the virtual machine 110 writes the desired pixel data to the virtual desktop buffer 111. The virtual desktop buffer may exist as a portion of the host system memory or video memory in graphics hardware 140 assigned to the virtual machines by the host operating system, for example. Virtual machines may be assigned their own portions of memory, as illustrated by the hashed boxes surrounding the virtual machines on FIG. 1.

With existing technology, a software process would determine which of the virtual machines 110, 120, and 130 had control of the display 171 of the host computer. The software process would then compose the final display by copying the contents of the virtual desktop buffer to composition buffer 151, which is read by the display controller of the graphics hardware 140, for example. In the composition process, it is common to have additional user interfaces added to the output of virtual machine. A typical example is to add interfaces to enable users to switch the physical display from one partition to another. As described previously, this software compositing method introduces security problems into the system because the software process could be potentially modified to capture the display data for a malicious user, or even hijack the display.

Making software desktop composition secure is prohibitively difficult because modem graphics devices are powerful but also extremely complicated. A typical O/S does not know how to control the graphics cores efficiently and must rely on the appropriate device drivers to translate the commands into machine dependent codes. Security of rendered pixels can be substantially improved if composition is done in hardware, configured through a simple register interface. With hardware support, the software composition process is removed from the primary O/S and the interfacing code may be placed in a trusted software process such as hypervisor 180, which is much smaller in size and therefore easier for its manufacturer to make security assertions.

In that context, secure hardware composition is desirably added to the graphics hardware 140 to automatically duplicate pixels from virtual desktop buffers 111, 121, or 131 to composition buffer 151. Instead of a software process to build graphics commands to copy the display data from the virtual desktop buffers, the graphics hardware 140 provides a simple interface to copy the contents of the virtual desktop buffers to the composition buffer 151. The virtual desktop buffers can then be secured from malicious software processes running in other partitions.

Furthermore, graphics hardware 140 must also limit memory access to composition buffer 151. Read access should be granted to the display logic to create the final image to the physical display. Write access may be granted to the secure composition engine to duplicate pixels from virtual desktop buffers.

To prevent tearing, the composition buffer 151 is desirably implemented in a double buffer manner. In this arrangement, two sections of memory are assigned as composition buffers. At any one time, the display controller reads from one buffer while securely compositing happens on the other. When rendering (compositing) completes for one frame, the roles of these two buffers are interchanged.

Double buffering is a well known prior art in the graphics/animation community. The buffer where rendering occurs is commonly labeled as the back buffer. When rendering is done, the back buffer is flipped to the display, which will take effect at the next display refresh. By then, the original display buffer can be used as the back buffer for the next frame. In more advanced systems, the number of back buffers may vary. The composition buffer 151 can be implemented using any system, method, or technique known in the art for graphics rich displays. The technique can be implemented in systems using any arbitrary number of back buffers in the composition process.

In the simplest case, graphics hardware 140 is only required to provide a simple interface to copy a virtual desktop buffer to the composition buffer. In this solution, hypervisor 180 intercepts display flip commands coming from partitions. If the partition also owns the display, hypervisor 180 will convert the flip command into secure hardware composition instructions. Otherwise, hypervisor 180 drops the flip request, because pixels generated from that partition should not be sent to the display. Note that compositing is required if additional graphics content is superimposed on top of the partition's output. Otherwise, hypervisor 180 can skip the compositing process and flip the output to the display directly.

In this solution, graphics hardware 140 may provide the proper register interface to define properties for both source and destination surface. Source surface refers to the virtual desktop buffer to copy pixels from, and destination is the composition buffer to copy pixels to. Surface attributes include, but not limit to, base address, color-depth (number of bits per pixel), color scheme (RGB versus YUV), width, height, and number of bytes per scan line. The composition process is therefore a simple pixel duplication process with support for color space conversion and alpha channel handling. Alpha channel support may be necessary as hypervisor 180 may need to overlay additional user interfaces on top of a partition's output. An example is to add an interface to allow users to switch the display from one partition to another.

In a more advance solution, pixel duplication may also involve coordinate translation. Instead of having a single partition to own the whole display, hypervisor may choose to show the output from each partition in a window such that the physical display can be shared.

Figure 2:
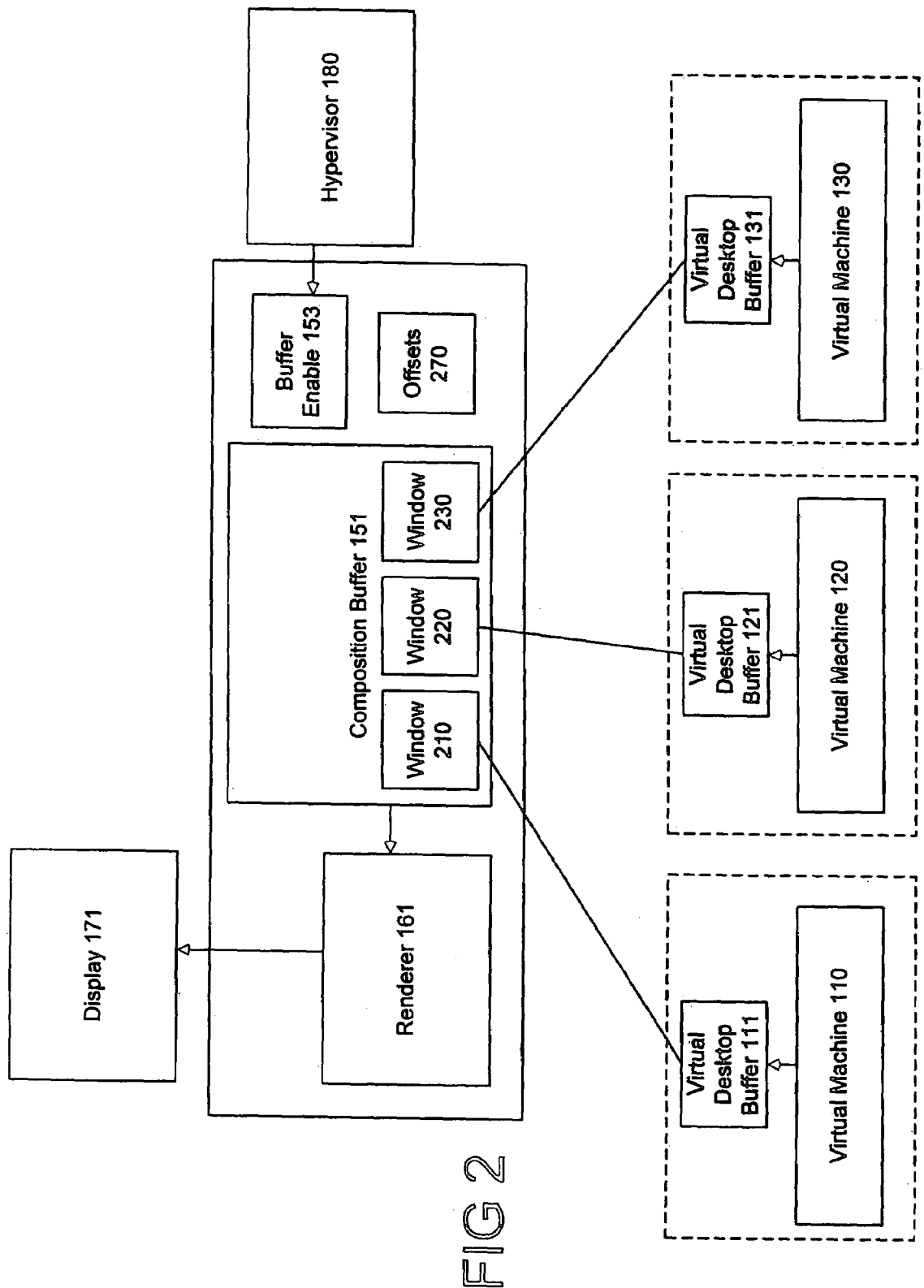
FIG. 2 is a block diagram illustrating an exemplary desktop buffer composition system in accordance with the invention.

FIG. 2 illustrates a modification of the desktop composition buffer system to support the windowed display of multiple virtual desktop buffers on a host system. A user or administrator of a host system may wish to simultaneously view the desktops or screen displays of the virtual machines currently executing at the host machine. A convenient way to facilitate such a display would be to treat each virtual desktop buffer as a window on the compositing desktop buffer. The simplest solution is to assign a depth value to each virtual desktop buffer such that hypervisor 180 has a way to decide the proper order of duplicating pixels from these virtual buffers. The simplest solution here is the so called painter's algorithm, where windows are sorted in depth order and compositing is done with the farthest (bottom) window first and the nearest (top) window last. This compositing may be done every time a flip happens on any partition. Optimization can be achieved easily by carefully resolving for regions that are affected by the flip operation and taking in only pixels that are changed.

In FIG. 2, the composition buffer 151 hosts windows 210, 220, and 230. In this simple example, the windows do not overlap and rendering order is not important. But in practice, it is commonplace to see overlapping windows and rendering order may be properly maintained by the hypervisor. The windows correspond to virtual machines executing on the host computer, and are desirably mapped or associated with a corresponding virtual desktop buffer. For example, window 210 corresponds to virtual machine 110, and is mapped to the virtual desktop buffer 111. Window 220 corresponds to virtual machine 120, and is mapped to the virtual desktop buffer 121. Similarly, window 230 corresponds to virtual machine 130, and is mapped to the virtual desktop buffer 131.

In this situation, virtual desktop buffers 111, 121, 131 and composition buffer 151 usually have different surface properties. More importantly, because each virtual machine is unaware that it does not have full control of the host system and that its display may be displayed in a window executing on the host system, rather than as a full screen, each virtual desktop will have a displacement from the origin of the composition buffer 151. It is necessary to translate the contents of the virtual desktop buffers to reflect their windowed location on the host display 171. To facilitate this, graphics hardware will need to provide additional registers to define the fixed translation when duplication needs to happen. This translation vector must be stored at a trusted location, such as offsets 270, that is accessible only from trusted software like hypervisor 180. The offsets may comprise a transformation between the coordinates of the particular virtual desktop buffer and the window assigned to the virtual machine on the display 171. The graphics hardware, when generating destination coordinates for duplicated pixels, should take this displacement into consideration.

In addition, a buffer enable 153 may also be introduced to the graphics hardware 140 to activate or disable this secure compositing feature. To ensure security, registers defining properties of both source and destination surfaces may be controlled by a trusted software process, such as the hypervisor 180, for example. However, how this is achieved is outside the scope of this invention.

Figure 3:
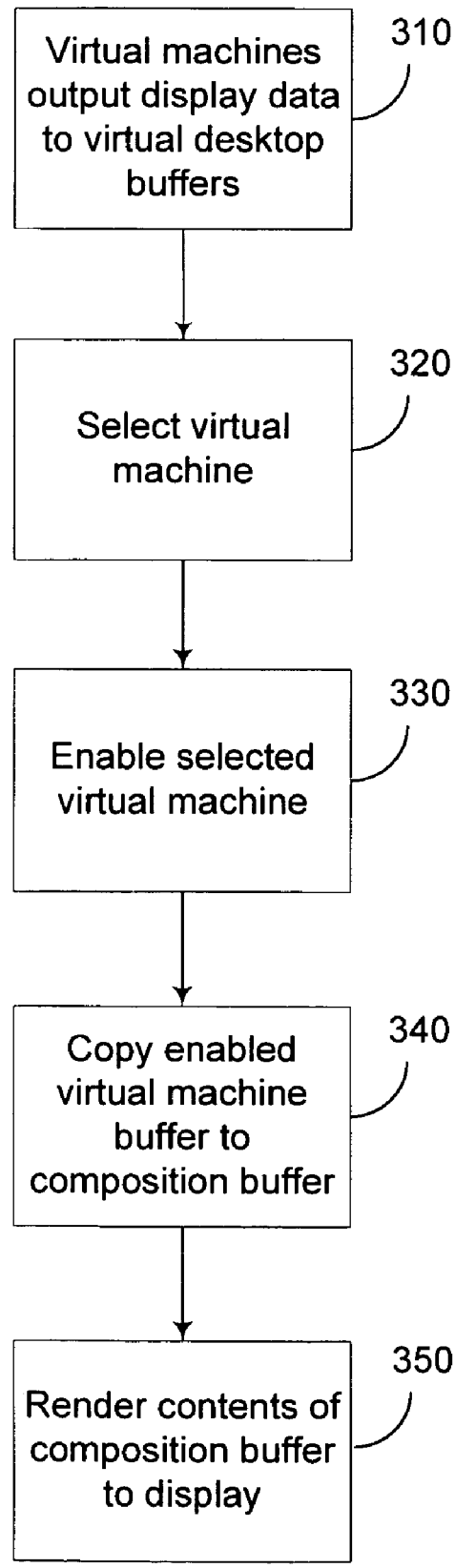
FIG. 3 is a block diagram illustrating an exemplary method for desktop buffer composition in accordance with the invention.

FIG. 3 is a block diagram illustrating an exemplary method for desktop buffer composition in accordance with the invention. A plurality of virtual machines are executed on a host computer, the host computer including graphics hardware, and a display. In the full screen case, hypervisor 180 determines a virtual machine to own the display based on user input. In the windowed case, hypervisor 180 determines rendering order based on user input. The virtual machines write display data to their respective virtual desktop buffers. When a flip occurs, hypervisor 180 makes a decision if secure composition needs to happen. Composition is required if hypervisor needs to add user interface on top of virtual machine's output or the flip has an effect only on part of the physical display. For the case where composition is required, a composition buffer on the graphics hardware may be used for the creation of the composed image that is sent to the display.

At 310, a plurality of virtual machines may be executing on a host computer. Each virtual machine is allotted some fraction of the recourses of the host computer, but believes that it has complete control of the host computer's resources. Consequently, the virtual machines the location and dimensions of their respective windows. Any system, method or technique known in the art for translating coordinates may be used.

At 350, the contents of the composition buffer are scanned and converted to signals appropriate for the physical display. The contents of the composition buffer may be scanned and displayed using any system, method, or technique known in the art.

Figure 4:
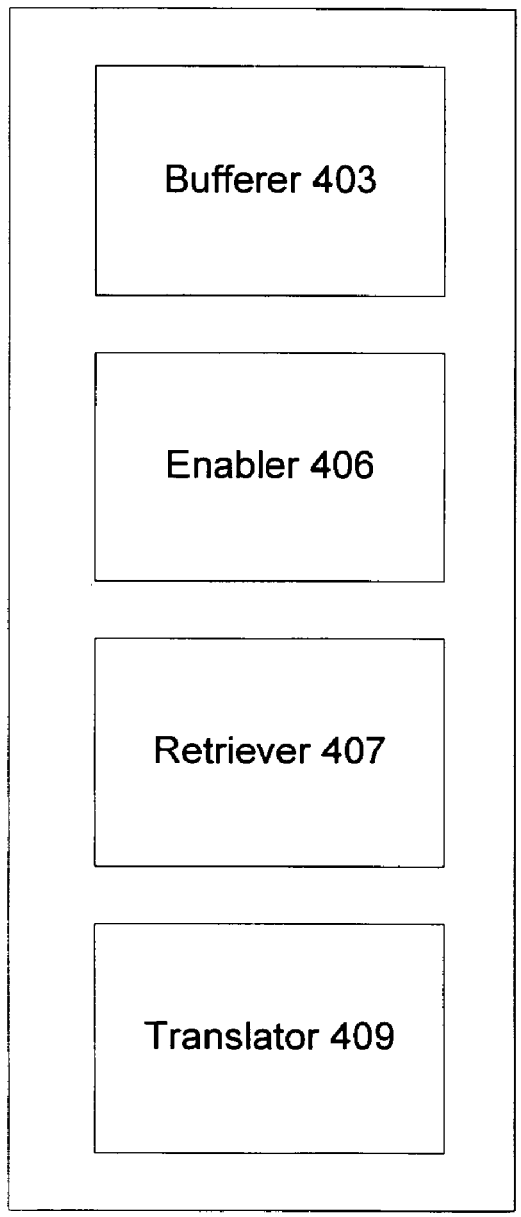
FIG. 4 is block diagram illustrating another exemplary desktop buffer composition system in accordance with the invention.

FIG. 4 is block diagram of an exemplary desktop buffer composition system in accordance with the present invention. The system includes several means, devices, software, and/or hardware for performing functions, including a bufferer 403, an enabler 406, a retriever 407, and a translator 409.

The buffer 403 comprises a hardware composition buffer. As described previously, the composition buffer receives a copy of the virtual desktop buffer of the virtual machine currently controlling the display of a virtual machine host computer. The contents of the composition buffer may then be rendered by the graphics hardware of the host computer and output on a display. Because the composition buffer is implemented in hardware, the risk of malicious applications capturing the contents of the buffer is greatly reduced.

Where the host computer is capable of providing control of the display to multiple virtual machines, in separate windows for example, the bufferer 403 may be divided into sections corresponding to the virtual machines. These sections may then receive the virtual desktop buffers of their corresponding virtual machines. The bufferer 403 may be implemented as a double buffer, for example. However, any system, method, or technique known in the art for implementiong a buffer may be used.

The enabler 406 desirably controls what virtual machine's virtual desktop buffer is copied to the bufferer 403. The enabler 406 may comprise a secure register, or other secure memory locationaccessible to the graphics hardware and some secure software process, such as the hypervisor. When the hypervisor provides the host display to one or more of the virtual machines, the hypervisor desirably sets the enabler 406 to indicate which of the virtual machines should be copied to the composition buffer. The enabler 406 can be implemented using firmware, hardware (in silicon), or a combination of both.

The retriever 407 desirably retrieves the source vitual desktop buffer, and optionally the destination composition buffer if alpha blending is required, applies the correct blending, and writes it out to the bufferer 403 through the translator 409. The retriever 407 may determine which virtual machine, or machines, is chosen as source by referencing the enabler 406. The retriver 407 is desirably implemented in hardware, such as a graphics card, for example. Implementing the retriever 407 in hardware may protect against malicious software generate display data believing that the display data is being displayed on the host computer's display. The generated display data may be written to a virtual desktop buffer allotted to the virtual machines by the host computer, for example.

At 320, a user or administrator of the host computer may have selected one of the virtual machines to control, or output display data to the display of the host computer. The administrator may wish to control or execute an application in the environment of the selected virtual machine, for example. Alternatively, the user way wish to view several virtual machines simultaneously on the host computer. In this case, the desktops associated with the virtual machines may be displayed in separate windows on the screen of the host computer, for example.

At 330, a secure process, or hypervisor, sets the graphics hardware of the host computer to reflect the selected virtual machine or machines. The graphics hardware desirably comprises a composition buffer and a buffer enable, for example. The composition buffer is a specialized hardware buffer that has special access control. Read access is granted to the display logic and write access to the secure composition process. The idea is to avoid a malicious software process from copying, or interfering with, the contents of the virtual desktop buffers, for example.

In order to direct the graphics hardware to copy the correct virtual machine buffer to the composition buffer, the buffer enable is set and surface properties configured by the hypervisor to specify which, if any, virtual desktop buffers should be copied by the graphics hardware to the composition buffer. Any system, method or technique known in the art for enabling a buffer may be used.

At 340, the graphics hardware may copy the contents of one or more virtual desktop buffers to the composition buffer. The graphics hardware desirably honors coordinates translation vector and alpha values on a source surface to perform correct blending with contents already on the composition buffer. Any system, method or technique know in the art of blending pixels may be used.

Where there are multiple virtual desktop buffers sharing the same display, or when the user interface overlay occupies only a small screen area, it is desirable to first translate the coordinates to reflect the location on the host computer display that the contents are displayed on. For example, because a user is viewing the virtual machines in separate desktop windows on the display, and the virtual machines output their display data as if they were being displayed directly on the display, the display data is desirably altered or transformed to reflect applications executing on the host system because access to the virtual desktop buffers can be restricted to the hardware device implementing the retriever 407. The retriever 407 can be implemented using any system, method, or technique known in the art for retrieving and manipulating pixel data by a hardware device.

The translator 409 transforms the display data retrieved from the virtual machines to the color format of composition buffer. It also translates the coordinates between source and destination surfaces. Because the virtual machines are unaware that they do not have complete control of the host system, including the display, the virtual machine output display data to the virtual machine buffers in a coordinate system relative to the entire display. On the host system, these virtual machines may be displayed in separate windows on the desktop, each with their own coordinate system relative to the display. Accordingly, to ensure that the virtual machines are displayed in their correct window on the host computer, the display data in the composition buffer is desirably transformed by the translator 409, prior to storing to composition buffer through bufferer 403. The transformation data, or offset, for the virtual machines may be stored on the graphics hardware for example. Any, system, method, or technique for translating display data may be used.

Exemplary Computing Environment

Figure 5:
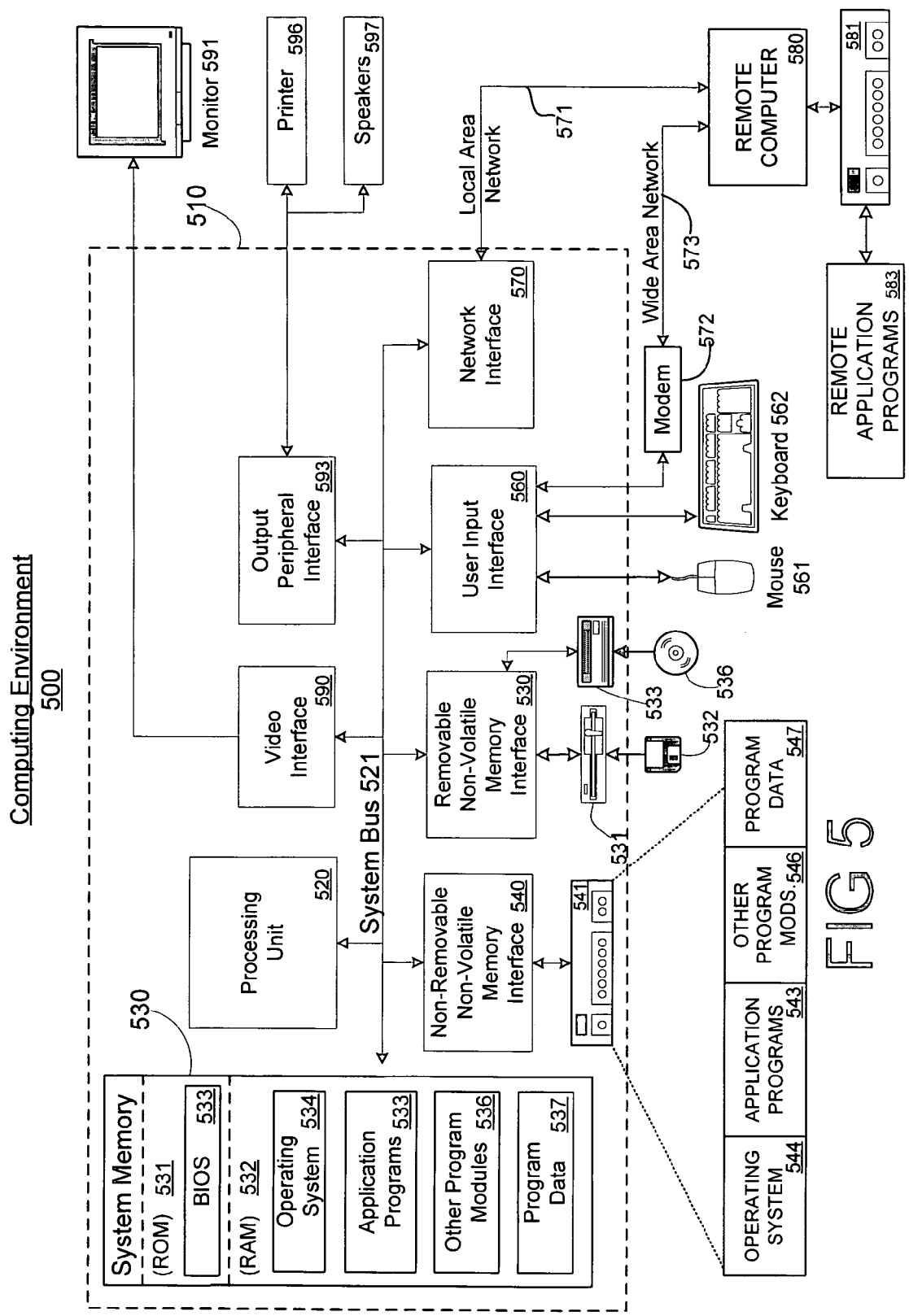
FIG. 5 is a block diagram showing an exemplary computing environment in which aspects of the invention may be implemented.

FIG. 5 illustrates an example of a suitable computing system environment 500 in which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520.

Computer 510 typically includes a variety of computer readable media. Computer readable media can be any available media that can be accessed by computer 510 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510.

The system memory 530 includes computer storage media in the form of volatile and/or non-volatile memory such as ROM 531 and RAM 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/non-volatile computer storage media. By way of example only, FIG. 5 illustrates a hard disk drive 540 that reads from or writes to non-removable, non-volatile magnetic media, a magnetic disk drive 551 that reads from or writes to a removable, non-volatile magnetic disk 552, and an optical disk drive 555 that reads from or writes to a removable, non-volatile optical disk 556, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted include a LAN 571 and a WAN 573, but may also include other networks. Such networking environments are commonplace in offices, enterprise-wide computer networks, intranets and the internet.

As mentioned above, while exemplary embodiments of the present invention have been described in connection with various computing devices, the underlying concepts may be applied to any computing device or system.

The various techniques described herein may be implemented in connection with hardware, firmware, or software or, where appropriate, with a combination of all of these. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method for desktop composition, the method comprising:
    executing at least two virtual machines at a host computer having graphics hardware, each virtual machine comprising a virtual desktop buffer;
    generating display data by the virtual machines to their corresponding virtual desktop buffer;
    executing a secure process comprising a hypervisor at the host computer to determine which virtual desktop buffer should be enabled;
    enabling at least one of the at least two virtual desktop buffers to instruct the graphics hardware to copy the display data of the enabled virtual desktop buffer;
    copying the display data of the enabled virtual desktop buffer to a composition buffer;
    copying the display data of the other one of the at least two virtual desktop buffers to the composition buffer wherein the composition buffer contains display data from the at least two virtual desktop buffers wherein the display data of each of the at least two virtual desktop buffers are displayed in separate windows; and
    transforming the display data into a format suitable for display on the host computer.

2. The method of claim 1, further comprising rendering the contents of the composition buffer to a display.

3. The method of claim 1, wherein the composition buffer is implemented in a hardware device, and copying the contents of the enabled virtual desktop buffers to the composition buffer comprises the hardware device reading the contents of the enabled virtual desktop buffers and writing the contents of the enabled virtual desktop buffers to the composition buffer.

4. The method of claim 3, wherein read access to the virtual desktop buffers is denied to software processes.

5. The method of claim 3, wherein read access to the virtual desktop buffers is denied to non-secure software processes.

6. The method of claim 1, wherein the composition buffer is a double buffer.

7. A computer, the computer comprising:
    a processor adapted to execute at least two virtual machines, each virtual machine generating display data into an associated virtual machine buffer, and a secure process comprising a hypervisor at the host computer to determine which associate virtual machine buffer should be enabled;
    memory adapted to store the virtual machine buffers;
    a graphics processor, the graphics processor comprising a composition buffer, and the graphics processor adapted to copy the contents of the virtual machine buffers that are enabled from the memory to the composition buffer, wherein the composition buffer is capable of containing display data from the two virtual machine buffers wherein the display data of each of the two virtual machine buffers are to be displayed in separate windows.

8. The computer of claim 7, wherein the graphics processor is further adapted to render the contents of the composition buffer.

9. The computer of claim 7, wherein the processor is further adapted to execute a secure process, wherein the secure process enables at least one virtual machine.

10. The computer of claim 9, wherein the secure process comprises a hypervisor.

11. The computer of claim 9, wherein the graphics processor is further adapted to determine which virtual machine is enabled, and copy the contents of the virtual machine buffer corresponding to the enabled virtual machine from the memory to the composition buffer.

12. The computer of claim 7, wherein the memory is further adapted to deny read access to software processes.

13. The computer of claim 7, wherein the memory is further adapted to only provide read access to secure software processes.

14. The computer of claim 7, wherein the memory is further adapted to only provide read access to the graphics processor.

15. The computer of claim 7, wherein the composition buffer is a double buffer.

16. A system for desktop composition, the system comprising:
    an enabling component for enabling at least one virtual machine, the virtual machine executing on a host computer;

a retrieval component for retrieving display data from the enabled virtual machine;

a composition buffer for storing the retrieved display data from the at least two virtual desktop buffers wherein the display data of each of the at least two virtual desktop buffers are displayed in separate windows;

a translation component for transforming the stored display data into a format suitable for display on the host computer; and a secure process component comprising a hypervisor to determine which virtual desktop buffer should be enabled.

17. The system of claim 16, wherein the retrieval component is part of a graphics hardware device, and the display data is retrieved from memory on the host computer by the graphics hardware.

18. The system of claim 16, wherein the enabling component comprises a secure process executing on the host computer.

* * * * *